United States Patent [19]
Molina

[11] 3,753,647
[45] Aug. 21, 1973

[54] LIQUID OXYGEN COMPATIBLE DYE PENETRANT METHOD FOR METAL DEFECT INSPECTION

[75] Inventor: Orlando G. Molina, Westminster, Calif.

[73] Assignee: North American Rockwell Corporation, El Segundo, Calif.

[22] Filed: Mar. 5, 1970

[21] Appl. No.: 16,803

[52] U.S. Cl............................ 8/85, 8/94, 117/37 R, 252/301.3 R
[51] Int. Cl............................................... D06p 1/68
[58] Field of Search................... 8/85, 94; 117/37 R; 252/301.3 R

[56] References Cited
UNITED STATES PATENTS

| | | | |
|---|---|---|---|
| 3,265,461 | 8/1966 | Luetzel et al. | 8/84 |
| 3,386,920 | 6/1968 | Alburger | 252/301.2 |
| 3,561,262 | 2/1971 | Borucki | 73/104 |
| 3,096,142 | 7/1963 | Hartmark | 8/85 |
| 3,518,205 | 6/1970 | Vukasovich | 252/301.3 |
| 3,555,071 | 1/1971 | Rao | 260/453 |

Primary Examiner—Norman G. Torchin
Assistant Examiner—John R. Miller
Attorney—L. Lee Humphries and Harold H. Card

[57] ABSTRACT

A liquid fluorescent dye penetrant containing a high volume concentration of a liquid halocarbon is taught as a very sensitive microdefect detector on metal surfaces. The dye penetrant is insensitive to chemical reaction or detonation with liquid oxygen in a standard impact safety test. The liquid dye penetrant safety factor is important in inspection of metal components later fabricated into rocket motor systems, which use liquid oxygen (LOX) in propellant systems, or the like powerful liquid oxidizers.

6 Claims, 1 Drawing Figure

EXAMPLE I
EXAMPLE IV
INVENTOR
ORLANDO G. MOLINA
ATTORNEY

з,753,647

LIQUID OXYGEN COMPATIBLE DYE PENETRANT METHOD FOR METAL DEFECT INSPECTION

CROSS REFERENCE TO A RELATED APPLICATION

This application relates to the copending U.S. Patent application Ser. No. 655,752, filed July 25, 1967, by O. G. Molina which was abandoned in favor of a continuation application, Ser. No. 68,475 filed Aug. 31, 1970, now abandoned. Further, this application relates to the copending application titled MANUFACTURING A SENSITIVE NON-FLAMMABLE DYE PENETRANT Ser. No. 16,806 on Mar. 5, 1970, now U.S. Pat. No. 3,671,183, by the same inventor, O. G. Molina.

BACKGROUND OF THE INVENTION

Dye penetrants are very useful adjuncts for nondestructive testing of metal workpiece surfaces. In many important and expensive mechanical devices, it is necessary to inspect every metal component of the system for structural defects, prior to final fabrication. Dye penetrants are useful in decreasing inspection processing time and can be highly sensitive in detecting microdefects in metal components of aluminum, steel, nickel, titanium and the like. It is particularly desirable that the inspection system, and the dye penetrants used in inspection, do not increase the danger or sensitivity of the mechanical components to reaction with strong oxidizers, which may later be placed in the mechanical devices. For example, a large rocket propellant motor and its propellant tanks may use liquid oxygen (LOX), or a like strong oxidizer, in the rocket propellant. It is quite important that the LOX not be reactive with any traces of the inspection dye penetrant which may remain in the microdefect of the inspected propellant tanks or other components, fabricated from inspected metal stock after cleaning. The teaching of this invention eliminates the hazard of traces of dye penetrant reacting explosively with liquid oxygen or other strong oxidizers.

SUMMARY OF THE INVENTION

A LOX and gaseous oxygen compatible liquid dye penetrant is taught, having good sensitivity for detection of micro-defects in metal surfaces. The liquid dye penetrant has low proportions of: N-methyl-2-pyrrolidone, isobutyl heptyl ketone, a non-ionic wetting and spreading agent, a fluorescent dye and a fluorescent dye brightener, all dissolved in a large proportion of a halocarbon. The halocarbon is a nonflammable liquid volatile at room temperature, relatively non-toxic, resistant to hydrolysis in contact with water, and inexpensive. The improved modification in dye penetrant is insensitive to chemical reaction, when tested at 72 ft. lb. impact on 1/16 inch thick aluminum discs, covered with the dye penetrant composition.

Included in the objects of this invention are:

First, to provide a halocarbon solvent base homogeneous liquid dye penetrant which is useful in metal surface micro-defect inspection tests, and is chemically compatible with LOX service.

Second, to provide a homogeneous halocarbon solvent base dye penetrant which is a sensitive detector of microdefects in metal surfaces.

Third, to provide a relatively non-toxic halocarbon solvent base dye penetrant for detecting microdefects in metal surfaces.

Fourth, to provide a liquid dye penetrant for metal surface microdefect detection which is not chemically reactive with some common structural metals or LOX and gaseous oxygen.

Further objects and advantages of this invention will become apparent in the following description to be read in conjunction with the accompanying microphotograph.

BRIEF DESCRIPTION OF THE DRAWING

FIG. 1 is a microphotograph of a quenched aluminum test specimen, comparing the sensitivity on inspection, of the dye penetrant of this invention with the sensitivity on inspection of another dye penetrant of the same general chemical composition.

DESCRIPTION OF THE PREFERRED EMBODIMENT

In the manufacturing of large thrust rocket motor systems, the functional reliability and the high cost of the motor system necessitate detailed inspection of the system's metal components during manufacture. LOX is a common superior oxidizer in rocket liquid propellants. It is important that the standard dye penetrant inspection technique does not provide organic residues in the micro structure of the inspected metal components which can react chemically and explosively, with the liquid or gaseous oxygen in ambient contact with the metal surfaces of the rocket motor system.

This very sensitive homogeneous liquid dye penetrant utilizes as a base, a non-toxic, nonflammable halocarbon, which is volatile at room temperature and which does not hydrolyse in the presence of moisture. The halocarbon can be selected from the class listed in Table 1. The other dye penetrant components are selected from N-methyl-2-pyrrolidone, a ketone, a wetting and spreading agent, a fluorescent dye, and a fluorescent dye brightener. Other of the dye penetrant components are present in minor volume concentrations, compared to the major volume concentration of the halocarbon.

Typically, the LOX compatible, sensitive liquid dye penetrant has the composition listed in Example I.

EXAMPLE I

| | Volume Percent |
|---|---|
| N-methyl-2-pyrrolidone | 0.44 |
| Isobutyl heptyl ketone | 1.30 |
| Wetting and spreading agent * | 2.59 |
| Brightening agent for fluorescent dye ** | 0.35 |
| Fluorescent dye *** | 0.12 |
| Halocarbon | 95.2 |

*Typically, nonionic Tergitol NPX—monyl phenyl polyethylene glycol $C_9H_{19}C_6H_4O\,(CH_2CH_2O)_{10.5}H$.

**Calcofluor White RW—a fluorescent dye brightener manufactured under U.S. Pat. No. 2,920,203, issued January 5, 1960.

*** Fluorol 7 GA—Color Index No. equivalent to Fluorescent Brightener Agent No. 75 of The Colour Index, 2nd Edition, 1956, Published by Society of Dyers and Colourists and the Am. Assn. Textile Chemists and Colorists, London, England and New York, N.Y.

TABLE 1

Halocarbon Solvents

| No. | Name | Formula | BP(°F) |
|---|---|---|---|
| 1. | 1-bromo-1-difluoro 2-bromo-2-difluoro ethane | $CBrF_2—CBrF_2$ | 118. |
| 2. | 1-dichloro-1-fluoro 2-chloro-2-difluoro ethane | $CCl_2F—CClF_2$ | 118. |
| 3. | 1-dichloro-1-fluoro | | |

| | | |
|---|---|---|
| 2-dichloro-2-fluoro ethane | $CCl_2F-CCl_2F$ | 199. |
| 4. 1,1,1, trichloro ethane | $CCl_3CH_3$ | 165. |
| 5. trichloroethylene | $CHCl=CCl_2$ | 188. |
| 6. tetrachloro ethylene | $CCl_2=CCl_2$ | 250. |

Other examples of the liquid dye penetrant of this invention are listed in the two examples below.

Example II

| | Volume Percent |
|---|---|
| N-methyl-2-pyrrolidone | 0.94 |
| Isobutyl heptyl ketone | 2.82 |
| Brightening agent for fluoroescent dye ** | 0.75 |
| Fluoroescent dye *** | 0.25 |
| Trichloroethane | 95.2 |

**See Example I footnote
*** See Example I footnote

EXAMPLE III

| | Volume Percent |
|---|---|
| N-methyl-2-pyrrolidone | 0.46 |
| Isobutyl heptyl ketone | 1.41 |
| Wetting and spreading agent * | 0.94 |
| Wetting and spreading agent **** | 1.41 |
| Brightening agent for fluorescent dye ** | 0.37 |
| Fluorescent dye *** | 0.12 |
| Trichloroethane | 95.3 |

*See Example I footnote
**See Example I footnote
***See Example I footnote
****Typically nonionic Tergitol NP-14—nonyl phenyl polyethylene glycol $C_9H_{19}C_6M_4O\ (CH_2CH_2O)_4\ H$ In the teaching of this invention the halocarbons listed in Table 1 are fully equivalent in use in Examples I, II and III. Other nonionic wetting and spreading agents, such as trimethylnonanol polyethylene glycol and octyl phenoxyethanol, and the like can be utilized. Other equivalent ketones can be utilized, such as acetone, b.p. 56°C; methylamyl ketone, b.p. 152°C; ethyl butyl ketone, 147°C; ethyl heptyl ketone, b.p. 211°C; and the like. Other fluorescent dyes than the Fluorol 7 GA of Example I can be used, and other fluorescent brightening agents.

It is required that all components of the dye penetrant composition be mutually soluble within the taught dye penetrant composition volume concentration ranges. Within the scope of this invention the volume concentrations of the N-methyl-2-pyrrolidone, fluorescent dye, and of the brightening agent for the fluorescent dye each need not exceed one volume percent. The ketone component and the wetting and spreading agent each do not exceed five volume percent. The halocarbon solvent or mixture of halocarbon solvents comprise the balance of the composition.

The scope of the teaching of this invention is illustrated by the comparative impact tests measurements which determine the compatibility of the dye penetrant compostions with liquid oxygen, and by the comparative microphotographs of FIG. 1.

In National Aeronautics and Space Administration specification MSFC-SPEC-106A, dated May 5, 1964, criteria and a method were established for determining the compatibility and impact sensitivity of materials with liquid and gaseous oxygen. Using the liquid dye penetrant compositions disclosed in Examples I, II and III, impact sensitivity tests were conducted. Individual, clean, unsealed, sulfuric acid anodized aluminum 6061-T6 discs, 11/16 inch diameter by 0.063 inch thick, were vapor degreased, then respectively soaked in the liquid dye penetrant of Examples I, II and III. The discs were then drained, at a 90° angle, for 15 minutes, and tested in an impact tester of conventional type, described in the above specification. Twenty specimen discs each coated with a single penetrant were impact tested at 72. ft-lb impact, while the discs were immersed at the bottom of a precooled test cup containing liquid oxygen. The penetrant samples were reported to be compatible with LOX at 72 ft lb impact, if there were no audible explosions, no visible flash in a darkened room, no discoloration of the aluminum 6061-T 6 specimen disc or evidence of disc charring.

A comparative penetrant composition similar in character to the earlier examples was also impact tested as detailed above. The composition of this comparative penetrant is listed in Example IV below.

EXAMPLE IV

| | Volume Percent |
|---|---|
| N-methyl-2-pyrrolidone | 9.98 |
| Isobutyl heptyl ketone | 29.8 |
| Wetting and spreading agent * | 19.8 |
| Wetting and spreading agent **** | 29.8 |
| Brightening agent for fluorescent dye ** | 7.98 |
| Fluorescent dye *** | 2.64 |

*See Example I footnote
**** See Example III footnote
**See Example I footnote
***See Example I footnote All of the dye penetrant Examples I, II and III successfully passed the 72 ft lb impact tests with LOX, as listed in Table 2. The dye penetrant of Example IV did not pass the same impact test, failing 15 times, out of 20 tests.

Having established the LOX compatibility of Examples I, II and III, their comparative sensitivity in detecting microdefects is well illustrated in the microphotographs of FIG. 1. A standard thermally treated microdefect sensitivity test block of 2014 aluminum is prepared by a water quench. A groove is disposed across the specimen block separating two equal block areas for test comparison purposes. The

TABLE 2

Oxygen Impact Tests

| Penetrant Example | No. Reactions Total No. Tests |
|---|---|
| Example I | 0/20 |
| Example II | 0/20 |
| Example III | 0/20 |
| Example IV | 15/20 | microcracks are uniformly distributed over the two test areas of the block, varying in length. In accordance with standard shop practice, two separate examples of dye penetrants are each separately painted on the separate test block areas, the excess of each solution washed off the test block with a water spray, and then dried with an air blast. Inspection of the comparative optical intensity of the penetrant treated microdefect or crack structure, at low power magnification, under ultraviolet light, clearly displays the microdefect structure. Detailed inspection tests have shown that the Examples I, II and III compositions are clearly equivalent to the much more concentrated composition Example IV in the clarity and detail of the optical display of the microcrack structure. FIG. 1 illustrates the comparative test block display of Example I and Example IV. The optical detail and intensity of the microdefect structure of the two examples are clearly equivalent in FIG. 1.

The equivalence of the optical sensitivity and clarity of the Examples I, II and III compositions to the much more concentrated composition of Example IV, together with the LOX compatibility of Examples I, II and III and non-compatibility of Example IV, clearly establish the inventive advance of this invention over prior teachings in the dye penetrant inspection art.

Obviously many modifications can be made in this improvement in the sensitive dye penetrant compositions. It is therefore understood that within the scope of the appended claims, the invention may be practiced otherwise than as specifically described.

I claim:

1. A sensitive liquid dye penetrant for a metal surface which leaves a liquid oxygen (LOX) compatible defect indicating dye penetrant residue upon the surface and in any surface defects upon evaporation of the solvent portion of the penetrant, comprising:
   a. N-methyl-2-pyrrolidone in a concentration up to one volume percent;
   b. a ketone whose boiling point is not more than 218°C in a concentration up to five volume percent;
   c. a fluorescent dye in a concentration up to one volume percent and soluble in said pyrrolidone;
   d. a brightening agent for said fluorescent dye in a concentration up to one volume percent and being soluble in said pyrrolidone; and
   e. the remainder constituting a halocarbon solvent, said halocarbon solvent having a boiling temperature below 260 °F. at atmospheric pressure and being nontoxic, non-flammable, resistant to hydrolysis, and a solvent for the aforesaid dye penetrant components,
   said dye penetrant being rendered non-reactive to liquid oxygen upon evaporation of said solvent.

2. The sensitive liquid dye penetrant of claim 1 and further including a nonionic wetting and spreading agent constituting not more than five volume percent of said dye penetrant.

3. The sensitive liquid dye penetrant of claim 1, wherein said ketone is isobutyl heptyl ketone.

4. The sensitive liquid dye penetrant of claim 1, wherein said halocarbon solvent is selected from the group consisting of:
   1-bromo-1-difluoro-2-bromo-2-difluoro ethane,
   1-dichloro-1-fluoro-2 ethane,
   1-dichloro-1-fluoro-2-dichloro-2-fluoro ethane,
   1,1,1 trichloro ethane,
   trichloroethylene, and
   tetrachloroethylene.

5. The sensitive liquid dye penetrant of claim 1, wherein said nonionic wetting and spreading agent is a nonyl phenyl polyethylene glycol.

6. The sensitive liquid dye penetrant of claim 1, wherein the volume ratio of halocarbon solvents to the sum of the other components is at least 10:1.

* * * * *